United States Patent
Tsai et al.

(10) Patent No.: US 9,213,184 B2
(45) Date of Patent: Dec. 15, 2015

(54) MICRO PROJECTOR DEVICE AND CONTROL METHOD THEREOF

(71) Applicant: LITE-ON IT CORPORATION, Taipei (TW)

(72) Inventors: Yu-Nan Tsai, Taipei (TW); Kevin K W Cheng, Taipei (TW); Chia-Hao Hsu, Taipei (TW); Chun-Lai Hsiao, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 56 days.

(21) Appl. No.: 14/147,473

(22) Filed: Jan. 3, 2014

(65) Prior Publication Data

US 2015/0109588 A1  Apr. 23, 2015

(30) Foreign Application Priority Data

Oct. 21, 2013  (CN) .......................... 2013 1 0495379

(51) Int. Cl.

| G03B 21/28 | (2006.01) |
|---|---|
| G02B 26/10 | (2006.01) |
| G03B 21/20 | (2006.01) |
| G09G 3/00 | (2006.01) |
| H04N 9/31 | (2006.01) |

(52) U.S. Cl.
CPC ............ *G02B 26/10* (2013.01); *G03B 21/2033* (2013.01); *G09G 3/00* (2013.01); *H04N 9/3129* (2013.01); *G02B 26/101* (2013.01); *G02B 26/105* (2013.01)

(58) Field of Classification Search
CPC ............... G02B 26/101; G02B 26/105; G02B 26/0833; G02B 26/0841; H04N 9/3129
USPC .................. 353/31, 69, 99; 359/196.1, 199.1, 359/200.6, 200.7, 223.1, 225.1, 291; 348/743–747
See application file for complete search history.

(56) References Cited

U.S. PATENT DOCUMENTS

| 2007/0053044 A1* | 3/2007 | Kawakami et al. ............ 359/223 |
|---|---|---|
| 2007/0177241 A1* | 8/2007 | Keh .................... G02B 26/0833 359/200.7 |
| 2008/0285103 A1* | 11/2008 | Mizumoto ..................... 359/199 |
| 2009/0066916 A1* | 3/2009 | Brown ............................ 353/31 |
| 2009/0244668 A1* | 10/2009 | Fujino et al. ................ 359/200.6 |
| 2012/0250129 A1* | 10/2012 | Nakatani ............ G02B 26/0841 359/200.6 |
| 2012/0307211 A1* | 12/2012 | Hofmann et al. ................ 353/31 |

* cited by examiner

*Primary Examiner* — Sultan Chowdhury

(57) ABSTRACT

The present invention provides a micro projector device including a MEMS mirror, a laser source module, a detection module, and a control unit. The MEMS mirror has a first portion and a second portion, the first portion pivots to the second portion, and the first portion oscillates in relation to the second portion. The laser source module generates a laser light to a reflection plane of the first portion of the MEMS mirror. The detection module detects a capacitance value between the first portion and the second portion. The control unit determines the relative position between the first portion and the second portion according to the capacitance value, and provides image data to the laser source module according to the relative position. The reflection plane of the first portion is configured to reflect the laser light from the laser source module to a projection plane.

13 Claims, 5 Drawing Sheets

MICRO PROJECTOR DEVICE AND CONTROL METHOD THEREOF

CROSS REFERENCE TO RELATED APPLICATIONS

This Application claims priority of China Patent Application No. 201310495379.3, filed on Oct. 21, 2013, the entirety of which is incorporated by reference herein.

BACKGROUND OF THE INVENTION

1. Field of the Invention

The invention relates to micro projector devices, and more particularly to micro projector devices having MEMS mirror.

2. Description of the Related Art

Nowadays, a projector is used as a display device for electronic devices (such as a computer) to output images. A conventional projector provides a light source for outputting an image by using a metal-halide lamp, such as an ultra-high pressure mercury lamp, so it is difficult to reduce the size of a conventional projector. For ease of carrying, some projectors use a laser light source and MEMS (Micro Electro Mechanical Systems) components to make the optical system of the projector smaller. A laser projector has the advantages of being compact, light and thin in comparison with a projector using a metal-halide lamp. However, in the operation of image output, the laser projector requires precise synchronization of image data with the scanning position of the laser light, in order to make the image clear.

BRIEF SUMMARY OF THE INVENTION

An embodiment of a micro projector device comprises a MEMS mirror, a laser source module, a detection module and a control unit. The MEMS mirror has a first portion and a second portion. The first portion pivots to the second portion, and the first portion oscillates in relation to the second portion. The laser source module generates a laser light to a reflection plane of the first portion of the MEMS mirror. The detection module detects an equivalent capacitance value between the first portion and the second portion. The control unit determines the relative position between the first portion and the second portion according to the equivalent capacitance value, and provides image data to the laser source module according to the relative position. The reflection plane of the first portion is configured to reflect the laser light from the laser source module to a projection plane.

In an embodiment, the first portion of the MEMS mirror further comprises a first driving electrode, and the second portion of the MEMS mirror further comprises a second driving electrode. When the control unit provides a scan driving signal to the first driving electrode or the second driving electrode, the first portion oscillates in relation to the second portion according to the scan driving signal. On the other hand, the control unit stops providing the scan driving signal to the first driving electrode or the second driving electrode, and the first driving electrode is adjacent to the second driving electrode.

In an embodiment, the detection module further provides a high-frequency carrier signal to the first driving electrode of the MEMS mirror, detects the amplitude of the high-frequency carrier signal of the first driving electrode, and determines the equivalent capacitance value according to the amplitude of the high-frequency carrier signal.

In an embodiment, the MEMS mirror uses the laser light of the laser source module to scan for a first scan direction of the projection plane by the oscillation of the first portion, and a trace of the laser light on the first scan direction forms one of the scan lines of an image.

The present invention also provides a micro projector control method for a micro projector device, and the micro projector device has a MEMS mirror with a first portion oscillating in relation to a second portion. The micro projector control method comprises: detecting an equivalent capacitance value between the first portion and the second portion; determining the relative position between the first portion and the second portion according to the equivalent capacitance value; determining image data according to the relative position; generating a laser light to a reflection plane of the first portion of the MEMS mirror according to the image data; and reflecting the laser light to a projection plane by the reflection plane of the first portion.

In an embodiment, wherein the first portion of the MEMS mirror further comprises a first driving electrode, the second portion of the MEMS mirror further comprises a second driving electrode, and the micro projector control method further comprises: providing a scan driving signal to the first driving electrode or the second driving electrode, and the first portion oscillates in relation to the second portion according to the scan driving signal when the first driving electrode or the second driving electrode receives the scan driving signal. On the other hand, when the first driving electrode and the second driving electrode do not receive the scan driving signal, the first driving electrode is adjacent to the second driving electrode.

In an embodiment, the micro projector control method further comprises: providing a high-frequency carrier signal to the first driving electrode of the MEMS mirror; detecting amplitude of a high-frequency carrier signal of the first driving electrode; and determining the equivalent capacitance value according to the amplitude of the high-frequency carrier signal.

In an embodiment, the micro projector control method further comprises: using the laser light of the laser source module to scan for a first scan direction of the projection plane by the oscillation of the first portion of the MEMS mirror, and a trace of the laser light on the first scan direction forms one of the scan lines of an image.

BRIEF DESCRIPTION OF DRAWINGS

The invention will become more fully understood by referring to the following detailed description with reference to the accompanying drawings, wherein.

DETAILED DESCRIPTION OF THE INVENTION

Figure 1:
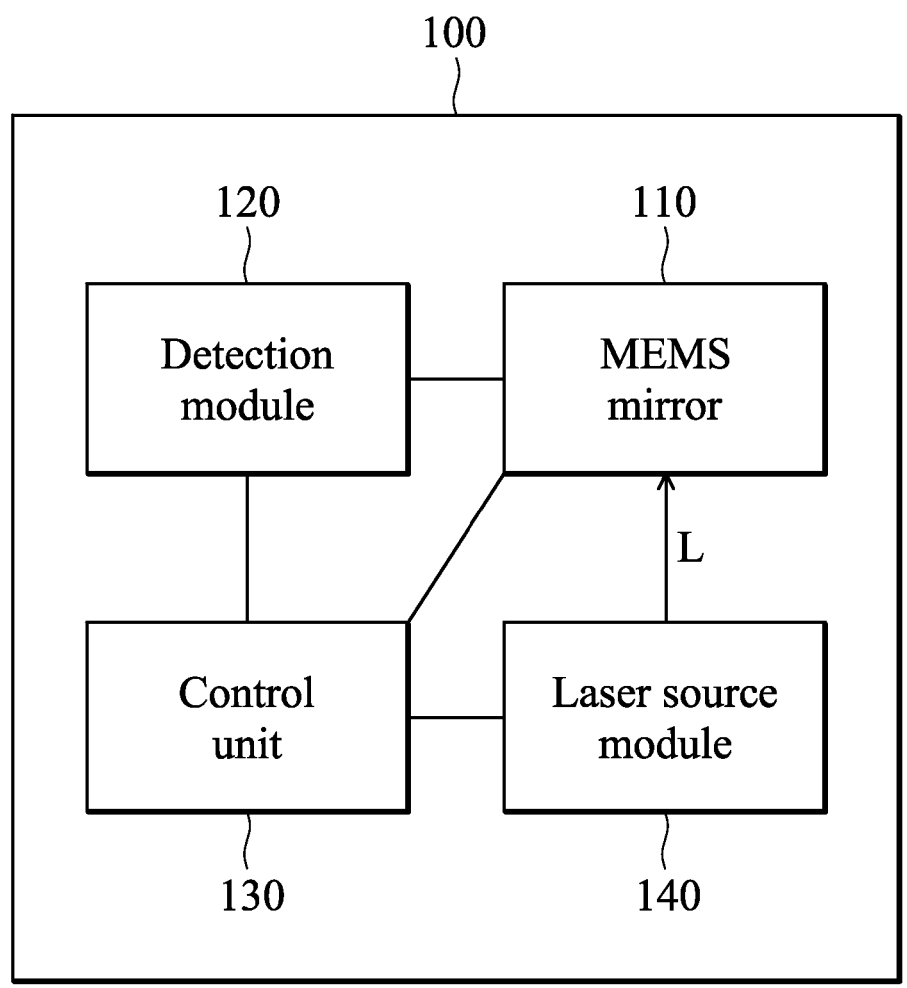
FIG. 1 is a block diagram illustrating an embodiment of the micro projector device according to the invention.

Embodiments, or examples, illustrated in the drawing are now disclosed using specific language. It will nevertheless be understood that the embodiments and examples are not intended to be limiting. Any alterations and modifications in the disclosed embodiments, and any further applications of the principles disclosed in this document are contemplated as that which would normally occur to one of ordinary skill in the pertinent art.

Figure 2A:
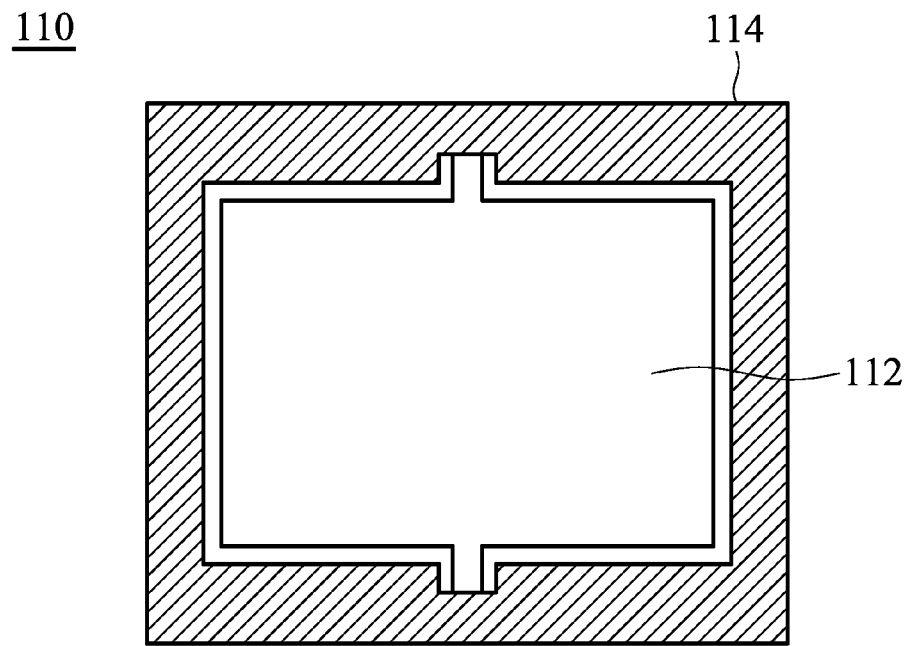
FIG. 2A is schematic diagram illustrating an embodiment of a MEMS mirror according to the invention.
Figure 2B:
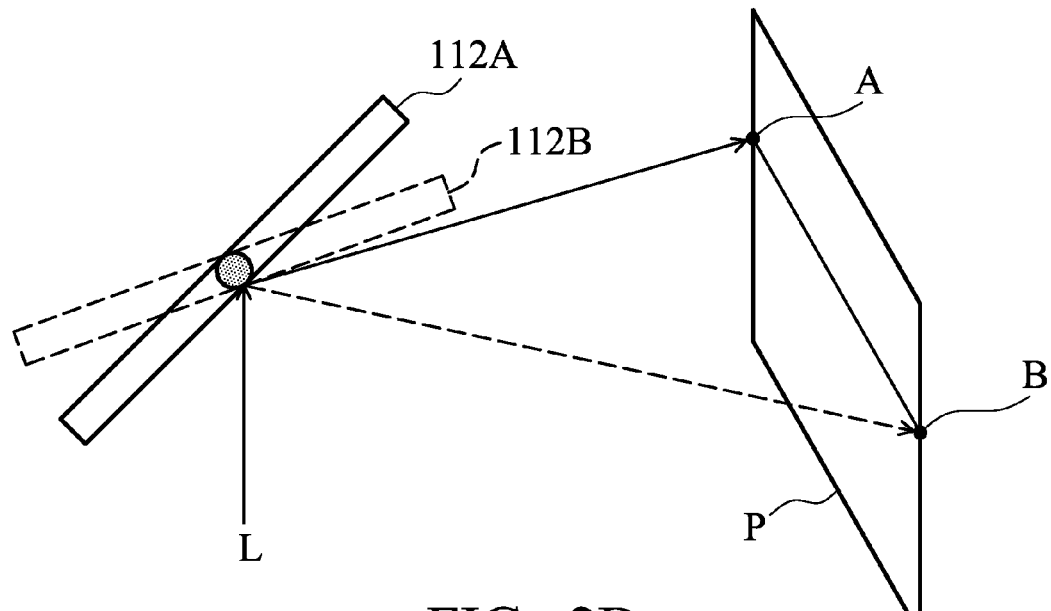
FIG. 2B is schematic diagram illustrating an embodiment in which a MEMS mirror oscillates and reflects a laser light according to the invention.

FIG. 1 is a block diagram illustrating an embodiment of the micro projector device according to the invention. The micro projector device 100 comprises a MEMS (Micro Electro Mechanical Systems) mirror 110, a control unit 130, a detection module 120 and a laser source module 140. The MEMS mirror 110 is configured to reflect a laser light from the laser source module 140 by a reflection plane of the MEMS mirror 110, and make the laser light scan on the projection plane P for displaying an image. In more detail, as shown in FIG. 2A, the MEMS mirror 110 has a first portion 112 having the reflection plane and a second portion 114, and the first portion 112 can oscillate in relation to the second portion 114. Therefore, since the first portion 112 oscillates, the reflected laser light L scans on the projection plane P with the oscillation direction of the first portion 112, and a trace of the laser light L forms one of the scan lines of the image. For example, in FIG. 2B, when the first portion 112 of the MEMS mirror 110 moves to a position 112A, the laser light L from the laser source module 140 is reflected to a scan point A on the projection plane P. When the first portion 112 of the MEMS mirror 110 moves to a position 112B, the laser light L from the laser source module 140 is reflected to a scan point B on the projection plane P. It should be noted that during the period of the laser light L scanning from the scan point A to the scan point B by oscillation of the first portion 112, the laser source module 140 sequentially emits the laser light L with the color and intensity corresponding to the image data of the scan point A to B in the image. Because the oscillation frequency of the first portion 112 of the MEMS mirror 110 is high, human eye may observe that a trace (ex., the scan point A to B) of the laser light L forms one of the scan lines of the image.

In addition, in some embodiments for displaying the whole image on the projection plane P, the first portion 112 of the MEMS mirror 110 not only oscillates in a horizontal direction, but also a vertical direction. Therefore, when the MEMS mirror 110 finishes scanning one horizontal scan line, the first portion 112 shifts along the vertical direction to scan the next horizontal scan line, so that the scanning of the whole image can be accomplished. Furthermore, due to the invention not focusing on the structure of the MEMS mirror, the related detail is not described, and any MEMS mirror can perform the above scanning operations for a laser light should be included in the embodiments of the invention.

Figure 2C:
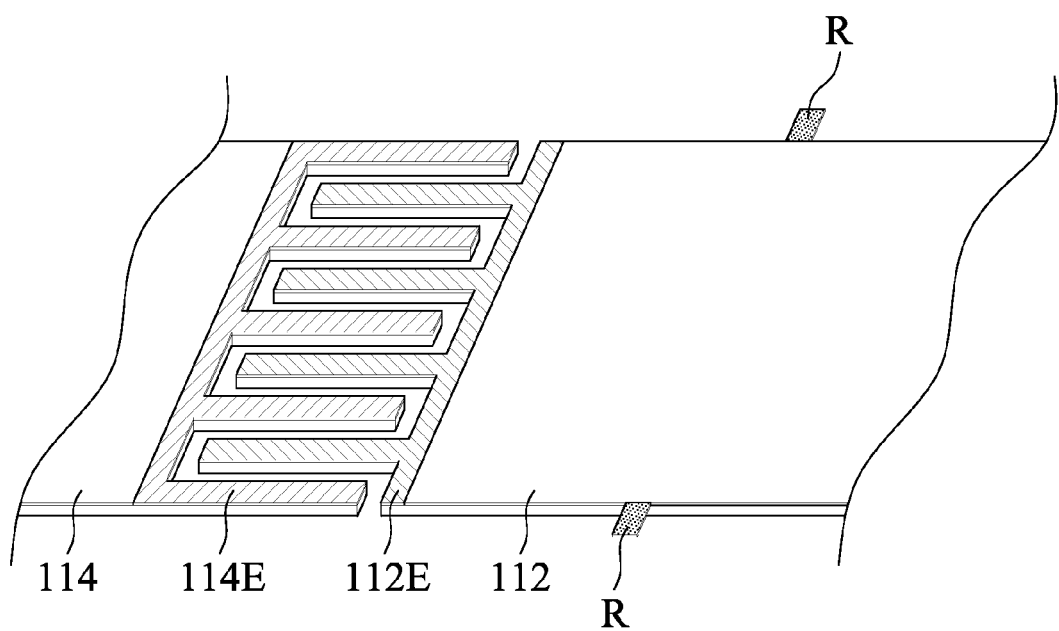
FIG. 2C is schematic diagram illustrating an embodiment of a portion of a MEMS mirror according to the invention.

The operations of the first portion 112 of the MEMS mirror 110 oscillating in relation to the second portion 114 are briefly described herein. FIG. 2C is a schematic diagram illustrating a portion of the MEMS mirror 110. As shown in FIG. 2C, the first portion 112 of the MEMS mirror 110 has a driving electrode 112E with a comb-structure, the second portion 114 of the MEMS mirror 110 has a driving electrode 114E with a comb-structure, and the first portion 112 pivots to the second portion 114 via a rotation shaft R. In some embodiments, the control unit 130 provides a scan driving signal with a resonant frequency of the MEMS mirror 110 to the driving electrode 112E, and the driving electrode 114E is electrically connected to ground. Therefore, the first portion 112 oscillates in relation to the second portion 114 by the rotation shaft R, because of the electrostatic force between the driving electrode 112E and the driving electrode 114E. In the other embodiments, the control unit 130 may provide the scan driving signal with a resonant frequency of the MEMS mirror 110 to the driving electrode 114E, and the driving electrode 112E is electrically connected to ground. Also, when the control unit 130 does not provide the scan driving signal to the driving electrode 112E or the driving electrode 114E, the driving electrode 112E stops and is adjacent to the driving electrode 114E.

The laser light L scans on the projection plane P to display the image based on the above-mentioned operations, but the image may be unclear or incorrect when the image data received by the laser source module 140 mismatches the scan position of the laser light L.

In order to match the image data received by the laser source module 140 with the scan position of the laser light L, the control unit 130 further obtains the oscillation angle of the first portion 112 of the MEMS mirror 110 to determine the scan position of the laser light L, and provide the image data of the determined scan position to the laser source module 140.

In some embodiments, in order to determine the oscillation angle of the first portion 112, the detection module 120 detects the equivalent capacitance value between the driving electrode 112E of the first portion 112 and the driving electrode 114E of the second portion 114. It should be noted that the distance between the driving electrode 112E and the driving electrode 114E changes when the oscillation angle of the first portion 112 changes, and correspondingly the equivalent capacitance value between two electrodes changes when the distance between two driving electrodes changes. Therefore, the control unit 130 can analyze the equivalent capacitance value between the driving electrode 112E and the driving electrode 114E to determine the oscillation angle of the first portion 112 of the MEMS mirror 110, such that the scan position of the laser light L can be determined accordingly.

Note that the equivalent capacitance value may be different when the manufacture, size or structure of the MEMS mirror 110 is different. Therefore, in some embodiments, the control unit 130 stores a look-up table or an algorithm with the correlation between equivalent capacitance value and the oscillation angle of the first portion 112 of the MEMS mirror 110. When the control unit 130 obtains the equivalent capacitance value between the driving electrode 112E and the driving electrode 114E, the control unit 130 can determine the scan position of the laser light L according to the look-up table or algorithm.

In some embodiments, the detection module 120 provides a high-frequency carrier signal to the driving electrode 112E via a resistor and the driving electrode 114E is connected to ground. The detection module 120 detects an amplitude of the high-frequency carrier signal of the driving electrode 112E. Because a decay of the amplitude of the high-frequency carrier signal at the driving electrode 112E changes in response to changes to the equivalent capacitance value of the MEMS mirror 110, the detection module 120 can determine the equivalent capacitance value of the MEMS mirror 110 according to the amplitude of the high-frequency carrier signal of the driving electrode 112E, and provide the equivalent capacitance value to the control unit 130.

Figure 3:
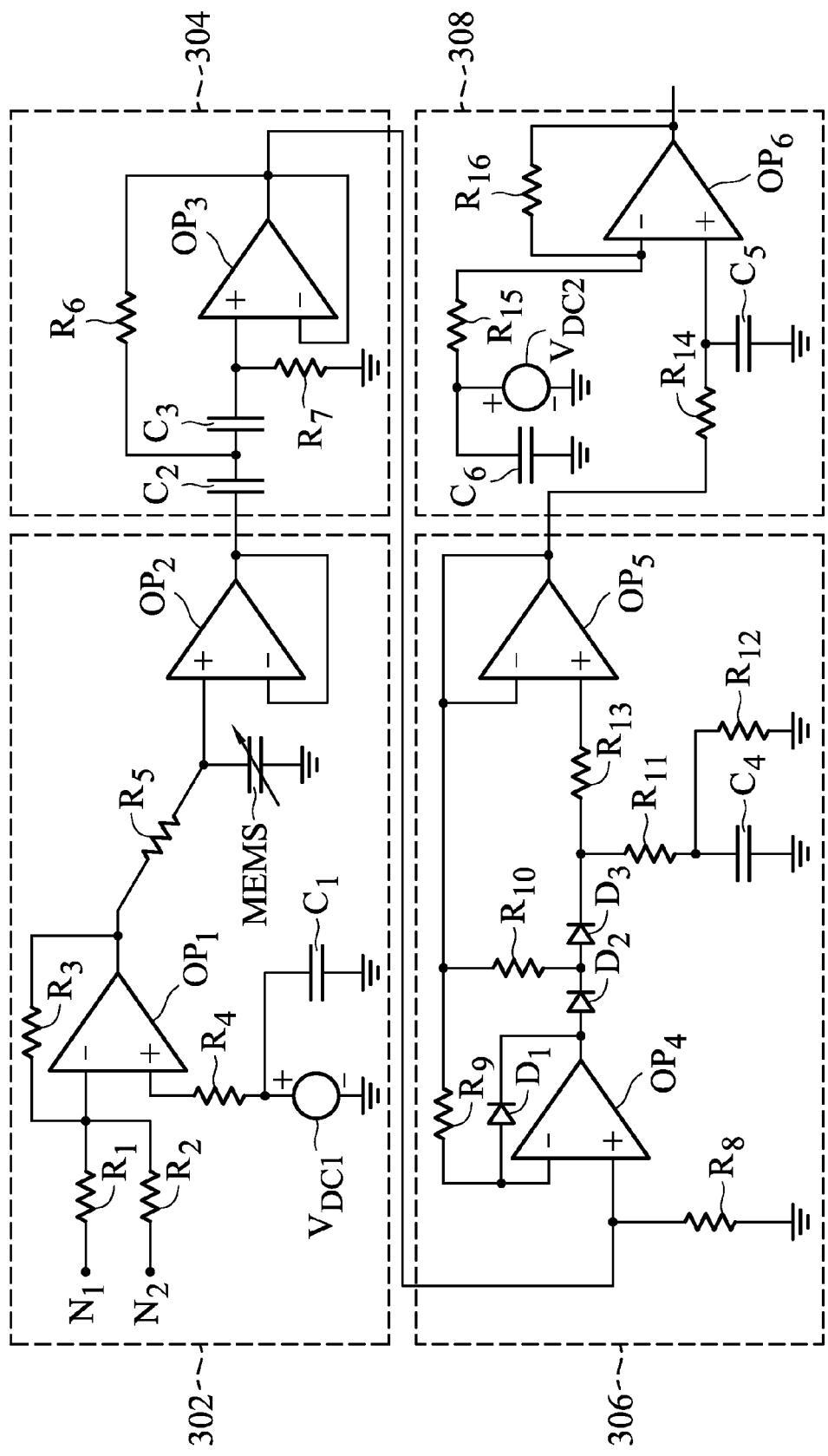
FIG. 3 is a circuit diagram illustrating an embodiment of the detection module according to the invention.

FIG. 3 is a circuit diagram illustrating an embodiment of the detection module according to the invention. In the embodiment, the detection module comprises an adder circuit 302, a band-pass filter circuit 304, an amplifier circuit 306 and a low-pass filter circuit 308.

The adder circuit 302 is configured to add a high-frequency carrier signal to the scan driving signal for the MEMS mirror 110, and comprises operational amplifiers $OP_1$, $OP_2$, resistors $R_1$, $R_2$, $R_3$, $R_4$, $R_5$, a DC-voltage source $V_{DC1}$ and a capacitor $C_1$. One terminal of the resistor $R_1$ is connected to a node $N_1$, the other terminal of the resistor $R_1$ is connected to a negative input terminal of the operational amplifiers $OP_1$, and the node $N_1$ receives the scan driving signal. One terminal of the resistor $R_2$ is connected to a node $N_2$, the other terminal of the resistor $R_2$ is connected to the negative input terminal of the operational amplifiers $OP_1$, and the node $N_2$ receives the high-frequency carrier signal. One terminal of the resistor $R_3$ is connected to the negative input terminal of the operational amplifiers $OP_1$, and the other terminal of the resistor $R_3$ is connected to an output terminal of the operational amplifiers $OP_1$. One terminal of the resistor $R_4$ is connected to the positive input terminal of the operational amplifiers OP1, and the other terminal of the resistor $R_4$ is connected to one terminal of the capacitor $C_1$ and a positive voltage terminal of the DC-voltage source $V_{DC1}$. The other terminals of the capacitor $C_1$ and the DC-voltage source $V_{DC1}$ are connected to ground. The output terminal of the operational amplifiers $OP_1$ is connected to one terminal of the resistor $R_5$, the other terminal of the resistor $R_5$ is connected to a positive input terminal of the operational amplifiers $OP_2$ and one of the driving electrodes (ex, driving electrode 112E) of the MEMS mirror, and the other driving electrode (ex, driving electrode 114E) is connected to ground. Therefore, a scan driving signal carrying a high-frequency carrier signal can be transmitted to the MEMS mirror 110, and drive the oscillation of the MEMS mirror 110. Also, the operational amplifier $OP_2$ is a buffer, and its negative input terminal is connected to its output terminal.

The band-pass filter circuit 304 comprises capacitors $C_2$, $C_3$, resistors $R_6$, $R_7$ and an operational amplifier $OP_3$. One terminal of the capacitors $C_2$ is connected to the adder circuit 302 (the output terminal of the operational amplifier $OP_2$), and the other terminal of the capacitors $C_2$ is connected to one terminal of the resistor $R_6$ and one terminal of the capacitor $C_3$. The other terminal of the resistor $R_6$ is connected to an output terminal and a negative input terminal of the operational amplifier $OP_3$, and the other terminal of the capacitor $C_3$ is connected to a positive input terminal of the operational amplifier $OP_3$ and one terminal of the resistor $R_7$. The other terminal of the resistor $R_7$ is connected to ground.

The amplifier circuit 306 comprises a capacitor $C_4$, diodes $D_1$, $D_2$, $D_3$, resistors $R_8$, $R_9$, $R_{10}$, $R_{11}$, $R_{12}$, $R_{13}$ and operational amplifiers $OP_4$, $OP_5$. One terminal of the resistor R8 is connected to the band-pass filter circuit 304 (the output terminal of the operational amplifier $OP_3$) and a positive input terminal of the operational amplifier $OP_4$, and the other terminal of the resistor $R_8$ is connected to ground. A negative input terminal of the operational amplifier $OP_4$ is connected to an anode of the diode $D_1$ and one terminal of resistor $R_9$, and an output terminal of the operational amplifier $OP_4$ is connected to a cathode of the diode $D_1$ and an anode of the diode $D_2$. The other terminal of the resistor $R_9$ is connected to a terminal of the resistor $R_{10}$, a negative input terminal and output terminal of the operational amplifier $OP_5$. The other terminal of the resistor $R_{10}$ is connected to a cathode of the diode $D_2$ and an anode of the diode $D_3$. A cathode of the diode $D_3$ is connected to a terminal of the resistor $R_{11}$ and a terminal of the resistor $R_{13}$. The other terminal of the resistor $R_{11}$ is connected to the capacitor $C_4$ and the resistor $R_{12}$, the other terminals of the capacitor $C_4$ and the resistor $R_{12}$ are connected to ground. The other terminal of the resistor $R_{13}$ is connected to a positive input terminal of the operational amplifier $OP_5$.

The low-pass filter circuit 308 comprises resistors $R_{14}$, $R_{15}$, $R_{16}$, capacitors $C_5$, $C_6$, a DC-voltage source $V_{DC2}$ and an operational amplifier $OP_6$. One terminal of the resistor $R_{14}$ is connected to the amplifier circuit 306 (the output terminal of the operational amplifier $OP_5$), the other terminal of the resistor $R_{14}$ is connected to the capacitor $C_5$ and a positive input terminal of the operational amplifier $OP_6$, and the other terminal of the capacitor $C_5$ is connected to ground. A negative input terminal of the operational amplifier $OP_6$ is connected to a terminal of the resistor $R_{15}$ and a terminal of the resistor $R_{16}$. The other terminal of the resistor R15 is connected to the capacitor $C_6$ and a positive voltage terminal of the DC-voltage source $V_{DC2}$, and the other terminal of the capacitor $C_6$ and a negative terminal of the DC-voltage source $V_{DC2}$ are connected to ground. The other terminal of the resistor $R_{16}$ is connected to an output terminal of the operational amplifier $OP_6$. The output terminal of the low-pass filter circuit 308 (the output terminal of the operational amplifier $OP_6$) is connected to the control unit 130.

It should be noted that the equivalent capacitance value of the MEMS mirror 110 changes when it oscillates, and the high-frequency carrier signal changes accordingly. Therefore, the detection module 120 uses the adder circuit 302, the band-pass filter circuit 304, the amplifier circuit 306 and the low-pass filter circuit 308 to analyze the decay of the high-frequency carrier signal, and the control unit 130 can determine the equivalent capacitance value of the MEMS mirror 110 according to the analyzed signal. For example, after the scan driving signal with the high-frequency carrier signal passes through the band-pass filter circuit 304, the amplifier circuit 306 and the low-pass filter circuit 308, the signal at the output terminal of the low-pass filter circuit 308 (the output terminal of the operational amplifier $OP_6$) has a frequency substantially equal to the frequency of oscillation of the MEMS mirror 110 (variation of the equivalent capacitance value). The amplitude variation of the signal at the output terminal of the low-pass filter circuit 308 corresponds to the oscillation of the MEMS mirror 110. In other words, the level of the signal at the output terminal of the low-pass filter circuit 308 can correspond to the oscillated position of the MEMS mirror 110. Therefore, there is a one-to-one relationship between the level of the signal at the output terminal of the low-pass filter circuit 308 and the oscillated position of the MEMS mirror 110, and the control unit 130 can determine the oscillation angle of the first portion 112 of the MEMS mirror 110.

Figure 4:
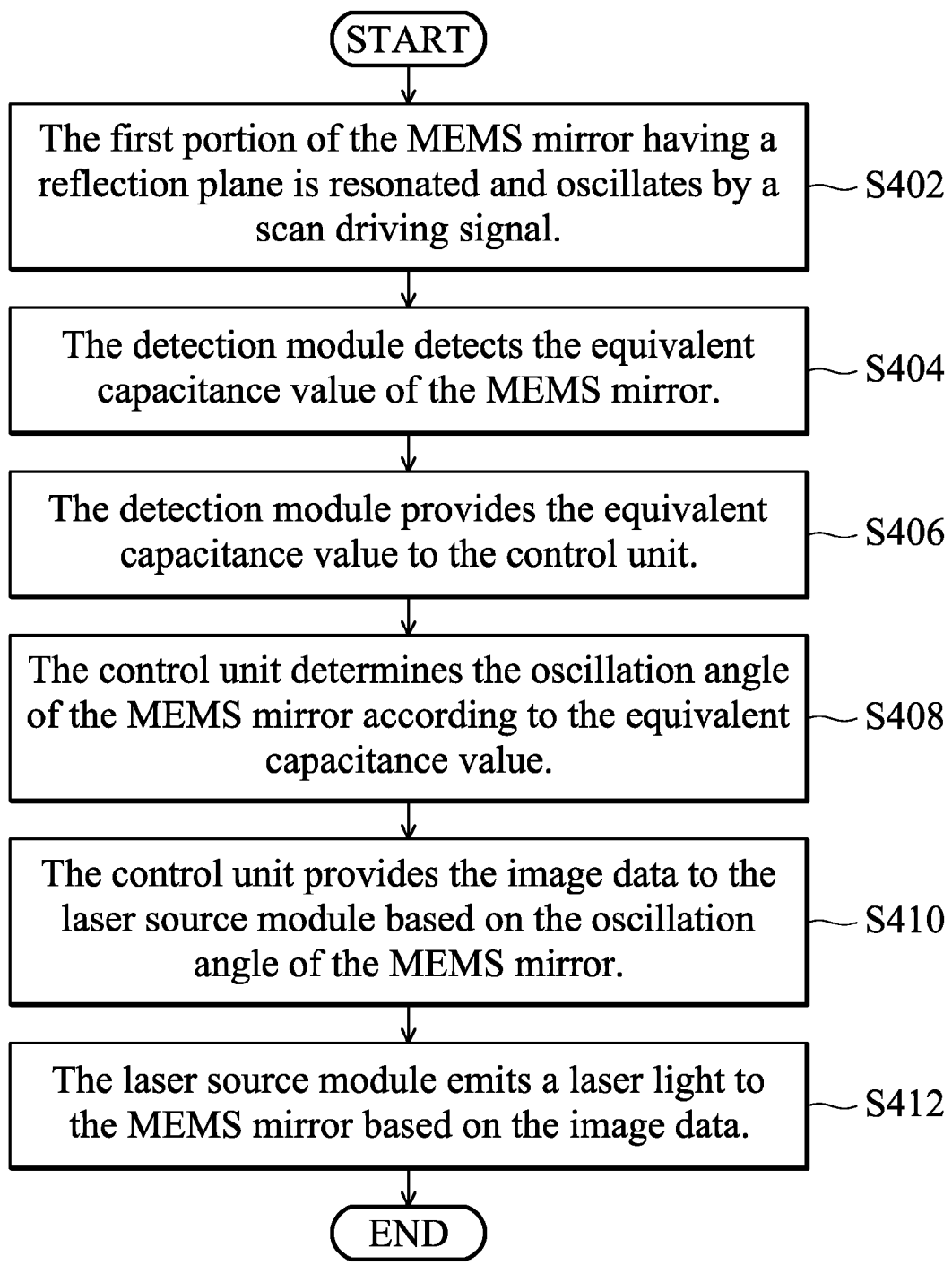
FIG. 4 is a flowchart of an embodiment of a control method for the micro projector device shown in FIG. 1.

FIG. 4 is a flowchart of an embodiment of a control method for the micro projector device 100 shown in FIG. 1. In step S402, the control unit 130 provides a scan driving signal with a resonant frequency of the MEMS mirror 110 to the driving electrode 112E of the first portion 112 or the driving electrode 114E of the second portion 114 of the MEMS mirror 110, and the first portion 112 of the MEMS mirror 110 having a reflection plane oscillates in relation to the second portion 114. In step S404, the detection module 120 detects the equivalent capacitance value between the driving electrode 112E and the driving electrode 114E.

Next, in step S406, the detection module 120 provides the equivalent capacitance value to the control unit 130. In step S408, the control unit 130 determines the oscillation angle of the first portion 112 of the MEMS mirror 110 according to the equivalent capacitance value. In step S410, the control unit 130 obtains image data which corresponds to the oscillation angle of the first portion 112 of the MEMS mirror 110 (It means the image data corresponds to the position of the projection plane P where the laser light L reflects to), and provides the image data to the laser source module 140. Finally, in step S412, the laser source module 140 emits a laser light L to the MEMS mirror 110, and the laser light L is reflected to the projection plane P by the MEMS mirror 110.

It should be noted that the steps mentioned above are performed repeatedly, so the laser light L scans the projection plane P to display the image.

Although the present invention and its advantages have been described in detail, it should be understood that various changes, substitutions and alterations can be made herein without departing from the spirit and scope of the invention as defined by the appended claim. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, process, machine, manufacture, and composition of matter, means, methods and steps, presently existing or later to be developed, that perform substantially the same function or achieve substantially the same result as the corresponding embodiments described herein may be utilized according to the present invention. Accordingly, the appended claims are intended to include within their scope such the process, machine, manufacture, and composition of matter, means, methods and steps. In addition, each claim constitutes a separate embodiment, and the combination of various claims and embodiments is with the scope of the invention.

What is claimed is:

1. A micro projector device, comprising:
   a MEMS mirror, having a first portion and a second portion, the first portion pivots to the second portion, and the first portion oscillates in relation to the second portion;
   a laser source module, generating a laser light to a reflection plane of the first portion of the MEMS mirror;
   a detection module, detecting an equivalent capacitance value between the first portion and the second portion; and
   a control unit, determining the relative position between the first portion and the second portion according to the equivalent capacitance value, and providing image data to the laser source module according to the relative position,
   wherein the reflection plane of the first portion is configured to reflect the laser light from the laser source module to a projection plane,
   wherein the detection module further comprises an adder circuit, wherein the adder circuit comprises a first operational amplifier, a second operational amplifier, a first resistor, a second resistor, a third resistor, a fourth resistor, a fifth resistor, a first DC-voltage source and a first capacitor,
   wherein a first terminal of the first resistor receives a scan driving signal, a second terminal of the first resistor is connected to a negative input terminal of the first operational amplifier, a first terminal of the second resistor receives a high-frequency carrier signal, a second terminal of the second resistor is connected to the negative input terminal of the first operational amplifier, a first terminal of the third resistor is connected to the negative input terminal of the first operational amplifier, a second terminal of the third resistor is connected to an output terminal of the first operational amplifier, a first terminal of the fourth resistor is connected to a positive input terminal of the first operational amplifier, a second terminal of the fourth resistor is connected to a first terminal of the first capacitor and a positive voltage terminal of the first DC-voltage source, a second terminal of the first capacitor and a negative voltage terminal of the first DC-voltage source are connected to ground, the output terminal of the first operational amplifier is connected to a first terminal of the fifth resistor, a second terminal of the fifth resistor is connected to a positive input terminal of the second operational amplifier and a first driving electrode of the first portion of the MEMS mirror, and a second driving electrode of the second portion of the MEMS mirror is connected to ground.

2. The micro projector device of claim 1, wherein when the control unit provides the scan driving signal to the first driving electrode or the second driving electrode, the first portion oscillates in relation to the second portion according to the scan driving signal.

3. The micro projector device of claim 2, wherein the control unit stops providing the scan driving signal to the first driving electrode or the second driving electrode, and the first driving electrode is adjacent to the second driving electrode.

4. The micro projector device of claim 2, wherein the detection module further provides the high-frequency carrier signal to the first driving electrode of the MEMS mirror, detects an amplitude of the high-frequency carrier signal of the first driving electrode, and determines the equivalent capacitance value according to the amplitude of the high-frequency carrier signal.

5. The micro projector device of claim 1, wherein the MEMS mirror uses the laser light of the laser source module to scan for a first scan direction of the projection plane by the oscillation of the first portion, and a trace of the laser light on the first scan direction forms one of scan lines of an image.

6. The micro projector device of claim 1, wherein the detection module further comprises a band-pass filter circuit, wherein the band-pass filter circuit comprises a second capacitor, a third capacitor, a sixth resistor, a seventh resistor and a third operational amplifier,
   wherein a first terminal of the second capacitor is connected to an output terminal of the second operational amplifier, a second terminal of the second capacitor is connected to a first terminal of the sixth resistor and a first terminal of the third capacitor, a second terminal of the sixth resistor is connected to an output terminal and a negative input terminal of the third operational amplifier, a second terminal of the third capacitor is connected to a positive input terminal of the third operational amplifier and a first terminal of the seventh resistor, and a second terminal of the seventh resistor is connected to ground.

7. The micro projector device of claim 6, wherein the detection module further comprises a amplifier circuit, wherein the amplifier circuit comprises a fourth capacitor, a first diode, a second diode, a third diode, an eighth resistor, a ninth resistor, a tenth resistor, a eleventh resistor, a twelfth resistor, a thirteenth resistor, a fourth operational amplifier and a fifth operational amplifier,
   wherein a first terminal of the eighth resistor is connected to an output terminal of the third operational amplifier and a positive input terminal of the fourth operational amplifier, a second terminal of the eighth resistor is connected to ground, a negative input terminal of the fourth operational amplifier is connected to an anode of the first diode, a cathode of the second diode and a first terminal of the ninth resistor, an output terminal of the fourth operational amplifier is connected to a cathode of the first diode and an anode of the second diode, a second terminal of the ninth resistor is connected to a first terminal of the tenth resistor, a negative input terminal and a output terminal of the fifth operational amplifier, a second terminal of the tenth resistor is connected to a cathode of the second diode and an anode of the third diode, a cathode of the third diode is connected to a first terminal of the eleventh resistor and a first terminal of the thirteenth resistor, a second terminal of the eleventh resistor is connected to a first terminal of the fourth capacitor and a first terminal of the twelfth resistor, a second terminal of the fourth capacitor and a second terminal of the twelfth resistor are connected to ground, and a second terminal of the thirteenth resistor is connected to a positive input terminal of the fifth operational amplifier.

8. The micro projector device of claim 7, wherein the detection module further comprises a low-pass filter circuit, wherein the low-pass filter circuit comprises a fourteenth resistor, a fifteenth resistor, a sixteenth resistor, a fifth capacitor, a sixth capacitor, a second DC-voltage source and a sixth operational amplifier, wherein a first terminal of the fourteenth resistor is connected to an output terminal of the fifth operational amplifier, a second terminal of the fourteenth resistor is connected to a first terminal of the fifth capacitor and a positive input terminal of the sixth operational amplifier, a second terminal of the fifth capacitor is connected to ground, a negative input terminal of the sixth operational amplifier is connected to a first terminal of the fifteenth resistor and a first terminal of the sixteenth resistor, a second terminal of the fifteenth resistor is connected to a first terminal of the sixth capacitor and a positive voltage terminal of the second DC-voltage source, a second terminal of the sixth capacitor and a negative voltage terminal of the second DC-voltage source are connected to ground, and a second terminal of the sixteenth resistor is connected to an output terminal of the sixth operational amplifier, and wherein the control unit determines the relative position between the first portion and the second portion according to a signal of the output terminal of the sixth operational amplifier.

9. A micro projector control method for a micro projector device of claim 1, wherein the micro projector control method comprises:

detecting the equivalent capacitance value between the first portion and the second portion;

determining the relative position between the first portion and the second portion according to the equivalent capacitance value;

determining image data according to the relative position;

generating the laser light to the reflection plane of the first portion of the MEMS mirror according to the image data; and reflecting the laser light to a projection plane by the reflection plane of the first portion.

10. The micro projector control method of claim 9, further comprising:

providing the scan driving signal to the first driving electrode or the second driving electrode, and the first portion oscillates in relation to the second portion according to the scan driving signal when the first driving electrode or the second driving electrode receives the scan driving signal.

11. The micro projector control method of claim 10, wherein when the first driving electrode and the second driving electrode do not receive the scan driving signal, the first driving electrode is adjacent to the second driving electrode.

12. The micro projector control method of claim 10, further comprising:

providing the high-frequency carrier signal to the first driving electrode of the MEMS mirror;

detecting an amplitude of the high-frequency carrier signal of the first driving electrode; and determining the equivalent capacitance value according to the amplitude of the high-frequency carrier signal.

13. The micro projector control method of claim 9, further comprising:

using the laser light of the laser source module to scan for a first scan direction of the projection plane by the oscillation of the first portion of the MEMS mirror, wherein a trace of the laser light on the first scan direction forms one of scan lines of an image.

* * * * *

UNITED STATES PATENT AND TRADEMARK OFFICE
CERTIFICATE OF CORRECTION

PATENT NO.         : 9,213,184 B2                              Page 1 of 1
APPLICATION NO.    : 14/147473
DATED              : December 15, 2015
INVENTOR(S)        : Tsai It is certified that error appears in the above-identified patent and that said Letters Patent is hereby corrected as shown below:

On the title page item (71) insert

--Applicant: Lite-On Technology Corporation, Taipei (TW)--

Signed and Sealed this
Twenty-sixth Day of April, 2016

Michelle K. Lee
*Director of the United States Patent and Trademark Office*